United States Patent [19]

Efrat et al.

[11] Patent Number: 5,923,575
[45] Date of Patent: Jul. 13, 1999

[54] METHOD FOR ELETRONICALLY REPRESENTING A NUMBER, ADDER CIRCUIT AND COMPUTER SYSTEM

[75] Inventors: Yacov Efrat, Omer; Itzhak Barak, Tel Aviv; Yaron Ben-Arie, Ramat-Gan, all of Israel; Shao Wei Pan, Lake Zurich, Ill.

[73] Assignee: Motorola, Inc., Schaumburg, Ill.

[21] Appl. No.: 08/912,257

[22] Filed: Aug. 15, 1997

[51] Int. Cl.$^6$ ....................................................... G06F 7/38
[52] U.S. Cl. ............................... 364/715.04; 364/748.07; 364/748.11
[58] Field of Search ........................ 364/715.03, 715.04, 364/715.08, 722, 746.2, 748.01, 748.04, 748.11, 760.01, 716.03, 748.07

[56] References Cited

U.S. PATENT DOCUMENTS

| | | | |
|---|---|---|---|
| 4,841,467 | 6/1989 | Ho et al. | 364/748.07 |
| 5,257,215 | 10/1993 | Poon | 364/716.03 |
| 5,570,309 | 10/1996 | Miyoshi et al. | 364/746.2 |
| 5,574,672 | 11/1996 | Briggs | 364/715.08 |

*Primary Examiner*—Hassan Kizou
*Assistant Examiner*—Douglas S. Lee
*Attorney, Agent, or Firm*—James E. Gauger

[57] ABSTRACT

The invention relates to a method for electronically representing a number V in a binary data word. Both the exponent and the mantissa are represented as 2' complement. The mantissa is normalized to 0.1.F if the number V is positive where F is the fraction of the mantissa. In case that the number V is negative the fraction F is normalized to 10.F. Usage of this format allows to design an improved adder which requires less hardware.

11 Claims, 5 Drawing Sheets

METHOD FOR ELETRONICALLY REPRESENTING A NUMBER, ADDER CIRCUIT AND COMPUTER SYSTEM

RELATED INVENTIONS

The present invention is related to the following inventions which are assigned to the same assignee as the present invention:

(1) "Computer Processor Utilizing Logarithmic Conversion and Method of Use thereof, having Ser. No. 08/430,158, filed on Mar. 13, 1995, now U.S. Pat. No. 3,597,670.

(2) "Exponentiator Circuit Utilizing Shift Register and Method of Using Same", having Ser. No. 08/401,515, filed on Mar. 10, 1995, now U.S. Pat. No. 5,553,012.

(3) "Accumulator Circuit and Method of Use Thereof", having Ser. No. 08/455,927, filed on May 31, 1995, now U.S. Pat. No. 5,644,520.

(4) "Logarithm/Inverse-Logarithm Converter and Method of Using Same", having Ser. No. 08/381,368, filed on Jan. 31, 1995, now U.S. Pat. No. 5,642,305.

(5) "Logarithm/Inverse-Logarithm Converter Utilizing Second Order Term and Method of Using Same", having Ser. No. 08/382,467, filed on Jan. 31, 1995, now U.S. Pat. No. 5,703,801.

(6) "Logarithm/Inverse-Logarithm Converter Utilizing Linear Interpolation and Method of Using Same", having Ser. No. 08/391,880, filed on Feb. 22, 1995, now U.S. Pat. No. 5,600,581.

(7) "Logarithm/Inverse-Logarithm Converter Utilizing a Truncated Taylor Series and Method of Use Thereof", having Ser. No. 08/381,167, filed on Jan. 31, 1995, now U.S. Pat. No. 5,604,691.

(8) "Logarithm Converter Utilizing Offset and Method of Use Thereof", having Ser. No. 08/508,365, filed on Jul. 28, 1995, now U.S. Pat. No. 5,629,884.

(9) "Method and System for performing a convolution operation", having Ser. No. 08/535,800, filed on Sep. 28, 1995.

TECHNICAL FIELD OF THE INVENTION

The present invention relates generally to computing and digital signal processing and, in particular, to techniques for electronically representing a number.

BACKGROUND OF THE INVENTION

For the purposes of computing and digital signal processing, in particular for telecommunication, it is known in the art to represent numbers as binary data words. Such a binary data word typically is representative of some real world value. In the case of digital signal processing such a binary data word typically represents a sampled value of some real process like sampled speech or video data.

To represent a number in a binary data word for the purposes of computing or digital signal processing a number of approaches are commonly used in the prior art. Integer numbers are usually represented in 2' complement. In the 2'complement form the most significant bit holds the sign if the data word is not declared to be an unsigned integer value. The 2' complement of a binary number is found by reversing all the digits of the number and then adding one. For example, the 2' complement of 0001 is 1110+1=1111. In mathematical terms the 2' complement x' of a number x is $$x'=2^k-x$$

Where both x' and x are represented as a binary number with k digits.

The most popular representation for floating—point numbers is the format according to ANSI/IEEE standard 754-1985 which has been implemented by nearly all floating-point chip sets including Intel's 8087/287/387, Motorola's 68881 as well as chip sets from AMD. The IEEE standard is therefore universal in microcomputers that accept those chips, including the IBM PC.

The way a number is electronically represented for computing purposes is highly influential on the performance of the computing or digital signal processing system which process such a number and therefore on the expense in terms of hardware to obtain a given computing throughput.

By definition, digital signal processing is connected with the representation of signals by sequences of numbers or symbols and the processing of these signals. DSP has a wide variety of applications and its importance is evident in such fields as pattern recognition, radio communications, telecommunications, radar, biomedical engineering, and many others.

At the heart of every DSP system is a computer processor that performs mathematical operations on signals. Generally, signals received by a DSP system are first converted to a digital format used by the computer processor. Then the computer processor executes a series of mathematical operations on the digitized signal. The purpose of these operations can be to estimate characteristic parameters of the signal or to transform the signal into a form that is in some sense more desirable. Such operations typically implement complicated mathematics and entail intensive numerical processing. Examples of mathematical operations that may be performed in DSP systems include matrix multiplication, matrix-inversion, Fast Fourier Transforms (FFT), auto and cross correlation, Discrete Cosine Transforms (DCT), polynomial equations, and difference equations in general, such as those used to approximate Infinite Impulse Response (IIR) and Finite Impulse Response (FIR) filters.

Computer processors vary considerably in design and function. One aspect of a processor design is its architecture. Generally, the term computer architecture refers to the instruction set and organization of a processor. An instruction set is a group of programmer-visible instructions used to program the processor. The organization of a processor, on the other hand, refers to its overall structure and composition of computational resources, for example, the bus structure, memory arrangement, and number of processing elements.

In a computer, a number of different organizational techniques can be used for increasing execution speed. One technique is execution overlap.

Execution overlap is based on the notion of operating a computer like an assembly line with an unending series of operations in various stages of completion. Execution overlap allows these operations to be overlapped and executed simultaneously.

One commonly used form of execution overlap is pipelining. In a computer, pipelining is an implementation technique that allows a sequence of the same operations to be performed on different arguments. Computation to be done for a specific instruction is broken into smaller pieces, i.e., operations, each of which takes a fraction of the time needed to complete the entire instruction. Each of these pieces is called a pipe stage. The stages are connected in a sequence to form a pipeline—arguments of the instruction enter at one end, are processed through the stages, and exit at the other end.

These are many different architectures, ranging from complex-instruction-set-computer (CISC) to reducedinstruction-set-computer (RISC) based architectures. In addition, some architectures have only one processing element, while others include two or more processing elements. Despite differences in architectures, all computer processors have a common goal, which is to provide the highest performance at the lowest cost. However, the performance of a computer processor is highly dependent on the problem to which the processor is applied, and few, if any, low-cost computer processors are capable of performing the mathematical operations listed above at speeds required for some of today's more demanding applications. For example, MPEG data compression of an NTSC television signal can only be performed using expensive supercomputers or special purpose hardware.

Many other applications, such as matrix transformations in real-time graphics, require data throughput rates that exceed the capabilities of inexpensive, single processors, such as micro processors and commercially available DSP chips. Instead, these applications require the use of costly, multiprocessor or multiple-processor computers. Although multiprocessor computers typically have higher throughput rates, they also include complex instruction sets and are generally difficult to program.

Therefore there is a need to provide for an improved method for electronically representing a number in a binary data word, an improved adder circuit and microprocessor incorporating such an adder circuit and an improved computer system.

SUMMARY OF THE INVENTION

The invention is pointed out with particularity in the appended claims. Preferred embodiments of the invention are given in the dependent claims.

The invention is advantageous in that it allows to represent both the exponent and the mantissa of a number in 2' complement form. This is made possible by normalizing the mantissa differently depending on whether the number to be represented is positive or negative. Such normalizations can be carried out with minimal hardware expense by performing shift operations.

In case that the number to be represented is 0 the invention allows to encode the value of 0 in the exponent. For this purpose a predefined value of the exponent bits indicates that the number equals 0. This predefined value can be for example a leading 1 with a sequence of zeros. If the exponent has a width of 4 bits, the value of zero would be represented by "1000" whereby the mantissa is "don't care"—in the example considered here.

Further the method for electronically representing a number is advantageous in that it allows to add two numbers represented in such a way more efficiently with less hardware expense. Due to the representation of the mantissa in 2' complement it is not necessary to compare the mantissas of the two numbers to be added before the calculation is carried in contrast to the above referenced IEEE standard.

Moreover the mantissas are always added and not subtracted also if they represent negative numbers. This is also due to the 2' complement presentation. An additional advantage is that no sign logic is needed. As a consequence a micro processor which uses the teaching of the invention can more efficiently perform summations and therefore have a higher computing throughput. If a computer program is to be carried out by the micro processor this has the effect that it can be carried out at a higher processing speed. In the case that the computer program is a digital signal processing application this has the effect that the microprocessor can deal with a higher sampling rate.

In digital signal processing like finite or infinite impulse response filtering typically a large number of multiplications has to be carried out. If the two operands to be multiplied are converted into the log domain the multiplication becomes a summation. The result is obtained by converting the sum back into the normal domain. A computer system of such a type is disclosed in above-identified related inventions number 1 (Ser. No. 08/430,158) and number 9 (Ser. No. 08/535,800). Implementation options for such a computer system are also described in various of the copending applications or patents [2] to [8].

Such a computer system operating in the log domain consists of a number of computing units which comprise an adder in order to perform the multiplication's in the log domain. If a number is represented according to the invention in such a computer system this allows to safe hardware for the adders, improve the operational speed and at the same time save precious silicon floor space. Also power can be saved since the design of the adders is more compact.

BRIEF DESCRIPTION OF THE DRAWINGS

The invention will become more apparent and will be best understood by referring to the following detailed description of a preferred embodiment in conjunction with the accompanying drawings in which.

DETAILED DESCRIPTION OF THE PREFERRED EMBODIMENTS

Figure 1:
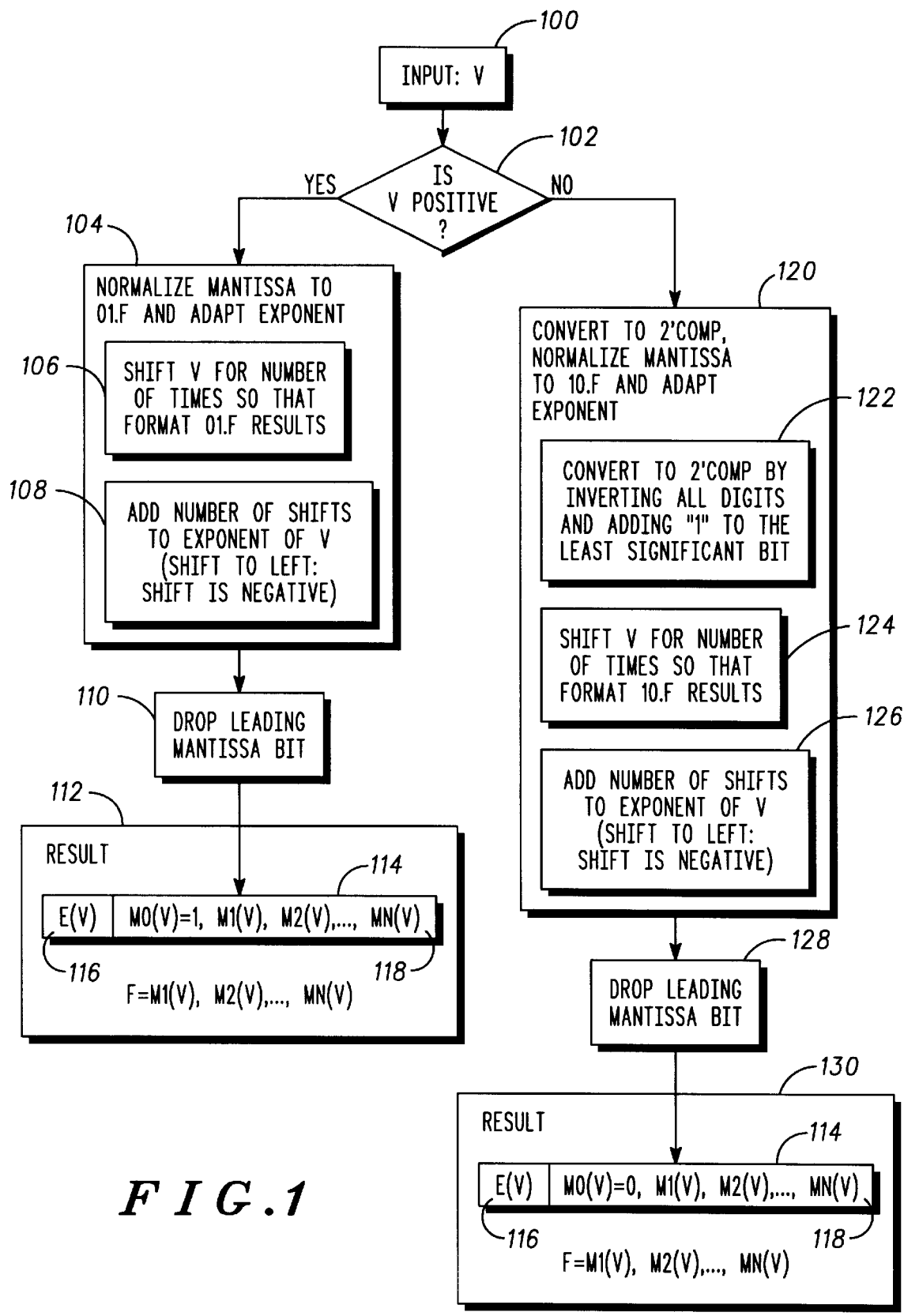
FIG. 1 is a flow chart illustrating a preferred embodiment of the method for electronically representing a number of the present invention.

Referring to the flow chart of FIG. 1 it is explained in more detail how a number V is represented the format of the invention. After the number V is inputted in step 100 it is decided in step 102 whether the number V is positive. The way this decision is made depends on the way the number V is represented initially. If the IEEE representation is used the sign bit can be checked to make the determination.

If it is decided in step 102 that the number V is positive the control goes to step 104 in which the number V is put into the form 01.F. The exponent of the number V is represented in 2'complement and adapted to the normalization into 01.F correspondingly:

First in step 106 the number V is shifted for a number of times so that a leading "01" before the decimal point results. This corresponds to the format of 01.F where F stands for the fractional bits behind the decimal point.

Second in step 108 the exponent of the number V is adapted according to the number of shifts performed in step 106. If number F is shifted in step 106 to the left in order to obtain the 01.F format this means that the shift has negative value. This value is subtracted from the initial exponent of the number V—if any. If the number V did not initially have an exponent the number of shifts of step 106 becomes the exponent of the number V. The exponent is represented as 2'complement.

In step 110 the leading mantissa bit "0" of the mantissa "01.F" is dropped. The result is outputted in step 112. The result consists of a binary data word 114 which has exponent bits E(V) 116 and mantissa bits M(V) 118.

The exponent E(V) is represented without the sign bit in 2' complement form. The mantissa M(V) has a length of N+1 bits M0(V), M1(V), M2(V), . . . , MN(V). The leading most significant bit M0(V) is set to be equal "1" to indicate that the mantissa is positive. The remaining part of the mantissa bits M1(V), M2(V), . . . , MN(V) is the fraction F of the format 01.1F to which the number V was shifted in step 106.

If it is decided in step 102 that the number V is negative the control goes to step 120 to convert the mantissa into 2'complement representation as well as the exponent, to normalize the mantissa and to adapt the exponent correspondingly:

First, in step 122 the number V is converted into a 2' complement representation. For the conversion into the 2' complement representation all digits of the number V are inverted and "1" is added to the least significant bit of the inverted number V. In step 124 the converted number V is shifted for a number of times so that the format 10.F results similar to the shifting of step 106. Also the exponent of the number F is adapted correspondingly and also represented as a 2' complement.

In step 126—similar to step 108—the most significant leading mantissa bit which is "1" is dropped. The result is obtained in step 130 which again consists of the exponent bits E(V) 116 and the mantissa bits M(V) 118. As opposed to the result obtained in step 112 the mantissa bit M0(V) equals "0" to indicate that the value of the number V is negative.

In the following examples are given of how a positive number V is represented in the format of the invention.

In the first example the number V equals −1.011 and is initially represented in the IEEE format.

Since the number V is negative—which is represented by the sign bit in the IEEE format—first the 2'complement has to be determined. The sign bit "−" is represented by "0" so that the initial IEDE representation of V as 01.011 results. En 2'complement this is 10.101 (after inversion of all bits of 01.011 to 10.100 and adding of 00.001); the original exponent of V—if any—is represented in 2'complement and otherwise remains unchanged. In this case no shifting was necessary to create the format 10.F. The resulting mantissa M(V) is therefore is M0(V)=0, M1(V)=1, M2(V)=0 and M3(V)=1 which corresponds to the fraction F=101 of the 10.101 representation of V.

In the second example the number V equals 1.010 and is also initially represented in the IEEE format. As V is positive it stays 01.010 and the exponent is the same. The resulting fraction F is 010.

In the next example V equals −1.000 (again in IEEE format). The 2'complement of 01.000 is 11.000. This does not correspond to the required format 10.F and must therefore be normalized. Shifting of 11.000 one shift left results in 10.000. This requires that the original exponent of V is decrement by one.

If the actual value of the number V in the format of the invention is to be determined this is done by evaluating $$V=+1.F \cdot 2^E$$

for the case that the sign bit M0(V)=1 and thus V positive, or $$V=-2^E \cdot (4-2.F)$$

in case that the sign bit M0(V)=0 and thus V negative.

Examples are shown in the below table 1.

TABLE 1

| mantissa M(V) | expanded mantissa | value (bin) |
| --- | --- | --- |
| 0000 | (1)0.000 | −10.000 |
| 0001 | (1)0.001 | −1.111 |
| 0010 | (1)0.010 | −1.110 |
| 0011 | (1)0.011 | −1.101 |
| 0100 | (1)0.100 | −1.100 |
| 0101 | (1)0.101 | −1.011 |
| 0110 | (1)0.110 | −1.010 |
| 0111 | (1)0.111 | −1.001 |
| 1000 | (0)1.000 | 1.000 |
| 1001 | (0)1.001 | 1.001 |
| 1010 | (0)1.010 | 1.010 |
| 1011 | (0)1.011 | 1.011 |
| 1100 | (0)1.100 | 1.100 |
| 1101 | (0)1.101 | 1.101 |
| 1110 | (0)1.110 | 1.110 |
| 1111 | (0)1.111 | 1.111 |

In the example considered in table 1 there are 4 bit positions in the mantissa M(V). No exponents are shown in table 1—the exponents are assumed to be equal to zero. The left most column of table 1 shows the mantissas M(V) of numbers which are represented according to the invention.

Starting from the top of the table the numbers having a leading "0"—in other words M0(V)=0—are negative whereas the numbers the lower portion of the table 1 have a most significant bit which is "1"—in other words M0=1— and which are therefore positive. The digits after the most significant bit—in this case three bits—are representative of the fraction F of the numbers V.

The middle column of the table 1 shows the expanded mantissas of the numbers V of the left most column. For the negative numbers this means that "1" is added as the most significant bit. This is the inversion of step 128 in which the leading "1" wars dropped. In the table the leading "1" appears in brackets. Also the decimal point is shown in the middle column of the table 1 corresponding to the normalization performed in the step 124.

The same applies analogously to the positive numbers V for which a "0" in brackets is added as an inversion of the step 110. Also the decimal point is shown corresponding to the normalization of the step 106. Using the fraction F as an input to equations 2 and 3, respectively the resulting value is shown in the right most column as a binary value whereby it is assumed that the exponent equals 0 for all the numbers V.

If the exponent of a number V is not equal to 0 the real value is obtained by shifting the result shown in the right most column for a number of times corresponding to the exponent.

In the following—with reference to FIG. 2—it is shown how the unique format of the invention to represent a number V can be advantageously used if two such numbers are to be added. In step 200 a number X and a number Y which are to be added are inputted. Both X and Y are in the format of the invention.

In step 202 the absolute difference D of the exponents E(X) and E(Y) is determined. In step 204 it is determined which of the exponents E(X) and E(Y) is bigger. En step 206 the preliminary assumption is made that the exponent of the result of the summation of X and Y equals the bigger one of the exponents E(X) and E(Y).

In step 208 the mantissas M(X) and M(Y) are expanded like shown in the middle column of table 1. This means that the leading most significant bit which is "0" for a positive number and "1" for a negative number is reintroduced into the representation of the mantissas to invert steps 110 and 128, respectively.

In step 210 the mantissa of the operand X or Y with the smaller exponent is shifted for a number of D shifts to the right. The information which of the mantissas has the smaller exponent is obtained from the result of step 204.

In step 212 the mantissa which is shifted in step 210 and the other expanded mantissa which was not shifted are added. For adding the two mantissas no sign logic is needed since both the shifted and the unshifted mantissas are represented as 2' complement numbers.

In step 214 it is evaluated whether an overflow occurred when the shifted and the unshifted mantissa were added in step 212. Overflow occurred if the shifted and the unshifted mantissas have the same most significant bit and the result of the summation has a different most significant bit. If this is the case the control goes to step 216 in which one is added to the preliminary exponent of the result as obtained in step 206. Further in step 216 the result obtained in step 212 of the added mantissas is shifted one position to the right in order to adjust the decimal point. The result obtained in step 216 is a final result and is represented in the format of the invention.

If it is determined in step 214 that no overflow occurred a sequence of leading "0" or "1" is to be detected in the result obtained by adding the shifted and unshifted mantissas in step 212. The detection of the sequence of leading "0" or "1" is done in step 218.

The length of the sequence of the leading "0" or "1" is denoted L in the following. If it is detected in step 220 that the result obtained in step 212 only consists of zeros this indicates that the result of the addition is in fact equal to zero. As a value of zero can not be represented in the mantissa when it is in a format according to the invention the value of zero is encoded in the exponent. This is done by assigning a predetermined value to the exponent of the result; the predetermined value is indicative of the value zero of the result. For this purpose any possible exponent value can be selected. In the example considered here the exponent is assigned to the value of 10000000 in an 8 bit representation.

If it is determined in step 220 that the sequence detected in step 218 does not only consist of zeros, the control goes to step 224. In step 224 the result obtained in step 212 is renormalized to the format of the invention. This is done by shifting the result obtained by adding the shifted and unshifted mantissas L−1 times to the left and correspondingly subtracting L−1 from the preliminary exponent of the result obtained in step 206. The resulting number has the form 01.F or 10.F depending on whether the number is positive or negative. Since the leading most significant bit in the format 01.F and 10.F is redundant it is thrown in step 226 corresponding to the respective steps 110 and 128 of FIG. 1.

Figure 3:
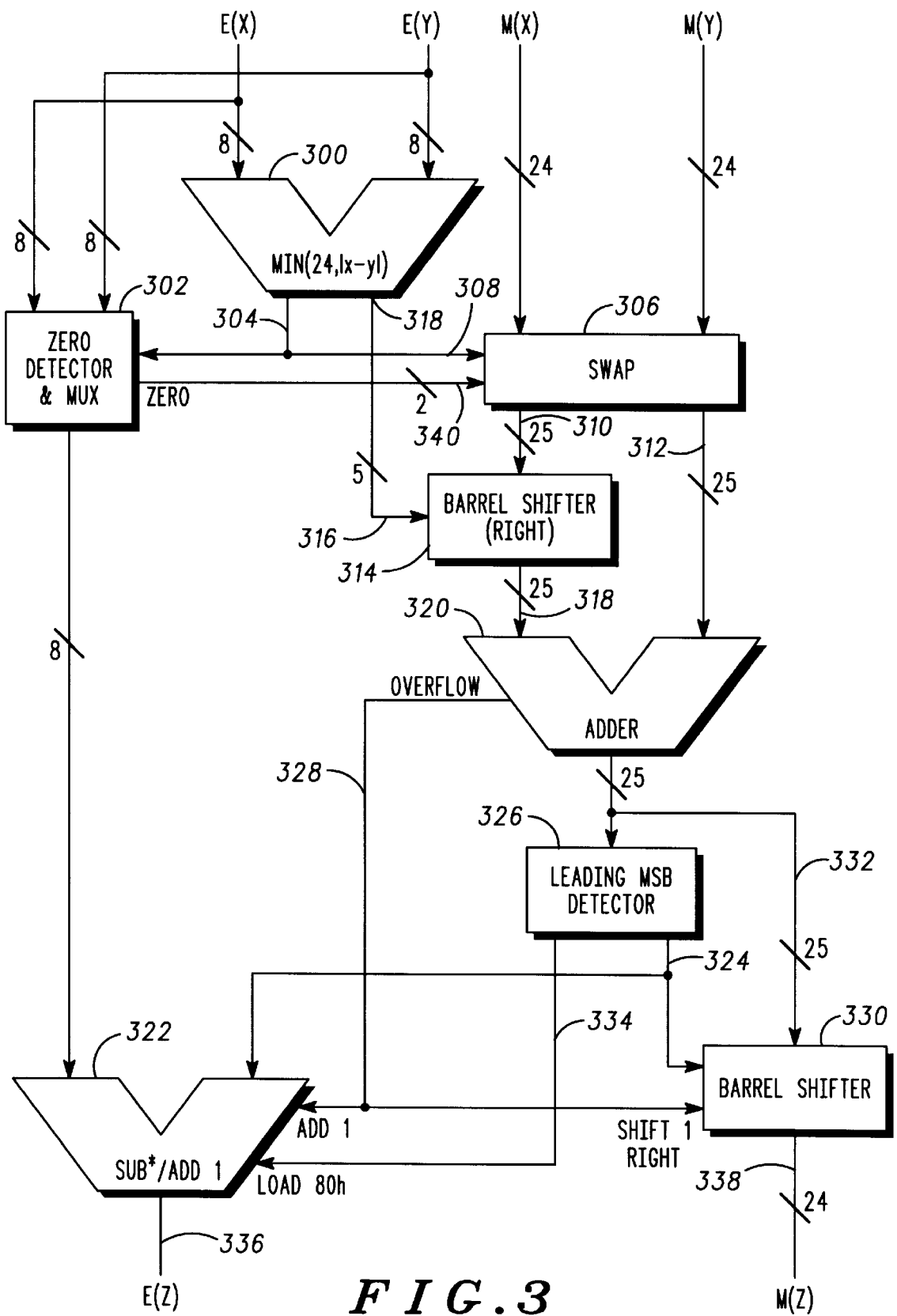
FIG. 3 shows a block diagram of a preferred embodiment of an adder according to the invention.

With reference to FIG. 3 now an adder circuit is described which can add the two numbers X and Y. In the example considered here the exponents are 8 bit wide and the mantissas are 24 bit wide. In the representation of steps 112 and 130 of FIG. 1 this means that there are 24 mantissa bits M0–M23. The exponents E(X) and E(Y) to be inputted into the adder shown in FIG. 3 again are in 2' complement form and the mantissas are normalized in the way as described with reference to FIG. 1.

The adder shown in FIG. 3 has a subtractor 300 which has two inputs to receive the exponents E(X) and E(Y). Further the adder of FIG. 3 has a zero detector and multiplexer 302 which also receives the exponents E(X) and E(Y) as input values. The subtractor 300 has a control output 304 which indicates which one of the exponents E(X) or E(Y) is the bigger one of both.

The control output 304 is coupled to the zero detector and multiplexer 302 as well as to swap circuit 306. The swap circuit 306 receives the mantissas M(X) and M(Y) as 24 bit inputs. The swap circuit 306 has a control input 308 which is coupled to the control output 304; further the swap circuit 306 has data outputs 310 and 312.

The data outputs 310 and 312 are one bit wider than the inputs of the swap circuit 306—in this case 25 bits instead of 24 bits. The data output 310 of the swap circuit 306 is coupled to barrel shifter 314 as a data input. The barrel shifter 314 has a control input 316 which is coupled to control output 318 of the subtractor 300.

The barrel shifter 314 has a control output 318 which is coupled to data input of adder block 320. The other data input of adder block 320 is coupled to the data output 312 of the swap circuit 306.

The zero detector and multiplexer 302 has its output coupled to subtractor adder by 1 block 322 as a data input. The other input of the subtractor/adder by 1 block 322 is coupled to output 324 of leading most significant bit detector 326.

The adder block 320 has an overflow output which is coupled via line 328 to the subtractor/adder by 1 block 322 and to barrel shifter 330. The barrel shifter 330 has its data input coupled to data output of the adder block 320 via line 332. The line 332 is 25 bits wide. The barrel shifter 330 is also coupled to the output 324 of the leading msb detector 326.

The leading msb detector 326 is also coupled via output line 334 to the subtractor/adder by 1 block 322. The exponent E(Z) of the result Z of the summation of X and Y is present at the output 336 of the subtractor/adder by 1 block 322 and the normalized mantissa M(Z) of the result Z is present at the output 338 of the barrel shifter 330.

In operation the exponent bits E(X) and E(Y) as well as the mantissa bits M(X) and M(Y) of the two numbers X and Y to be added are inputted simultaneously into the adder circuit. By means of the subtractor 300 the absolute difference D of the exponents E(X) and E(Y) is determined.

If the difference D is bigger than the width of the mantissa input into swap circuit 306—in this case 24 bit—the width of the mantissa input is taken as the difference D since this is the maximum number of shifts which can be performed. This corresponds to step 202 of FIG. 1.

The subtractor 300 also determines which one of the exponents E(X) and E(Y) is the bigger one. This corresponds to step 204 of FIG. 2. The information which one of the exponents is bigger is available at the control output 304. According to the logical value of the control output 304 the zero detector and multiplexer 302 is controlled to output the bigger one of the exponents E(X) and E(Y) to the subtractor/adder by 1 block 322. This corresponds to step 206 of FIG. 2.

The information which one of the exponents E(X) or E(Y) is bigger is also inputted into the swap circuit 306 at its control input 308. The swap circuit 306 swaps the inputs M(X) and M(Y) so that the mantissa M of one of the numbers X or Y having the smaller exponent is outputted at the data output 310 to the barrel shifter 314.

The result of the determination of the difference D is available at the control output 318 of the subtractor 300 and is inputted into the control input 316 of the barrel shifter 314.

Figure 2:
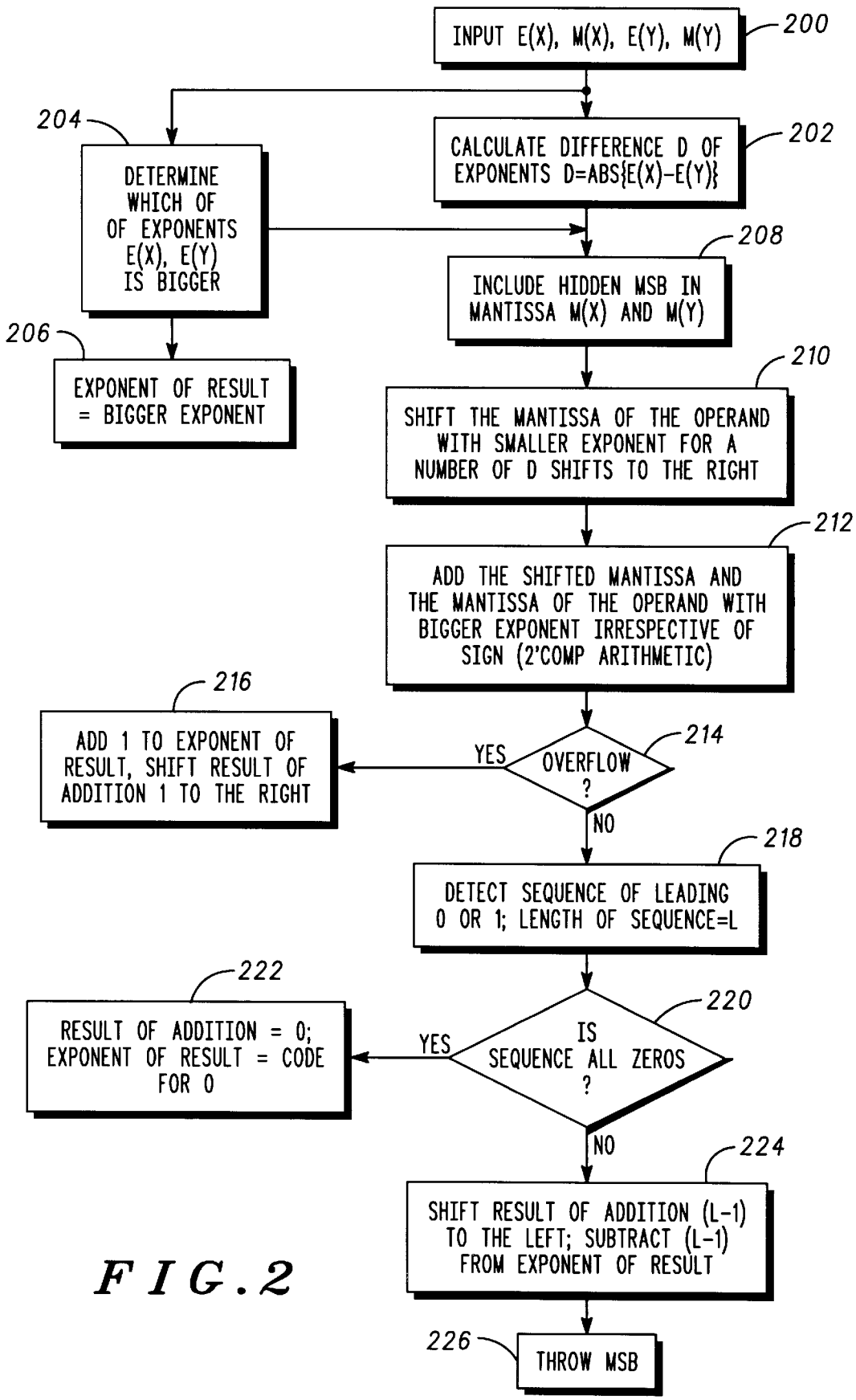
FIG. 2 is a flow chart of a preferred embodiment of the method for adding two numbers according to the present invention.

In the swap circuit 306 the hidden most significant bit is included in the mantissas M(X) and M(Y)—corresponding to step 208 of FIG. 2. As a consequence the data outputs 310 and 312 of the swap circuit 306 are one bit wider than the mantissa inputs—in this case 25 bits wide. The barrel shifter 314 shifts the expanded mantissa of the operand having the smaller exponent for a number of ED shifts to the right— corresponding to step 210 of FIG. 2.

The result of this shift operation is available at the control output 318 of the barrel shifter 314 and is still 25 bit wide. Consecutively both the shifted and the unshifted mantissas are inputted into the adder block 320.

If an overflow occurs when the shifted and unshifted mantissas are added in the adder block 320 this is indicated by line 328 both to the subtractor/adder by 1 block 322 and the barrel shifter 330. This has the effect that the value of the output line 334 is ignored by the subtractor/adder by 1 block 322 and that 1 is added to the exponent inputted by the zero detector and multiplexer 302 into the subtractor/adder by 1 block 322. The result of this addition is the final result of the exponent E(Z) which is outputted at output 336. Correspondingly, the barrel shifter 330 shifts the result outputted by adder block 320 via line 332 one position to the right and drops the leading most significant bit so that the resulting mantissa M(Z) is obtained at output 338. This corresponds to step 216 of FIG. 2.

If no overflow occurs in the adder block 320 (cf. step 214 of FIG. 2) the leading most significant bit detector 326 which has its data input coupled to the data output of the adder block 320 detects a sequence of leading "0" or "1" to detect the length of the sequence L—like explained with respect to step 218 of FIG. 2. The value of L is available at the output 324 of the leading msb detector 326. If the value of L reveals that the result of the summation in adder block 320 is zero this is notified by the leading msb detector 326 to the subtractor/adder by 1 block 322 via load output line 334 and a predetermined value which is indicative of the result being zero is loaded into the subtractor/adder by 1 block 322. This loaded value is the resulting exponent E(Z). This corresponds to step 222 of FIG. 2.

If the result obtained by adder block 320 is not zero, L−1 is subtracted from the exponent inputted by the zero detector and multiplexer 302 into the subtractor/adder by 1 block 322 in order to obtain the resulting exponent E(Z). Correspondingly the mantissa is normalized by shifting a number of L−1 times to the left in barrel shifter 330. Again the leading most significant bit is dropped in the barrel shifter 330 so that a 24 bit wide resulting mantissa M(Z) is obtained. This corresponds to step 226 of FIG. 2.

In case that the result obtained at the output of adder block 320 is zero the value of the resulting mantissa M(Z) is "don't care" because the value of the exponent indicates that the number Z is in fact zero. If however one of the input values X or Y is zero this is detected in the zero detector and multiplexer 302 which compares both exponents E(X) and E(Y) with the predefined exponent value which is indicative of zero—in this case 80 h. If zero is detected by the zero detector and multiplexer 302 this is notified to the swap circuit 306 via line 340 and the mantissa of the corresponding number X or Y which is 0 is filled with "0" to overwrite any don't care values.

Figure 4:
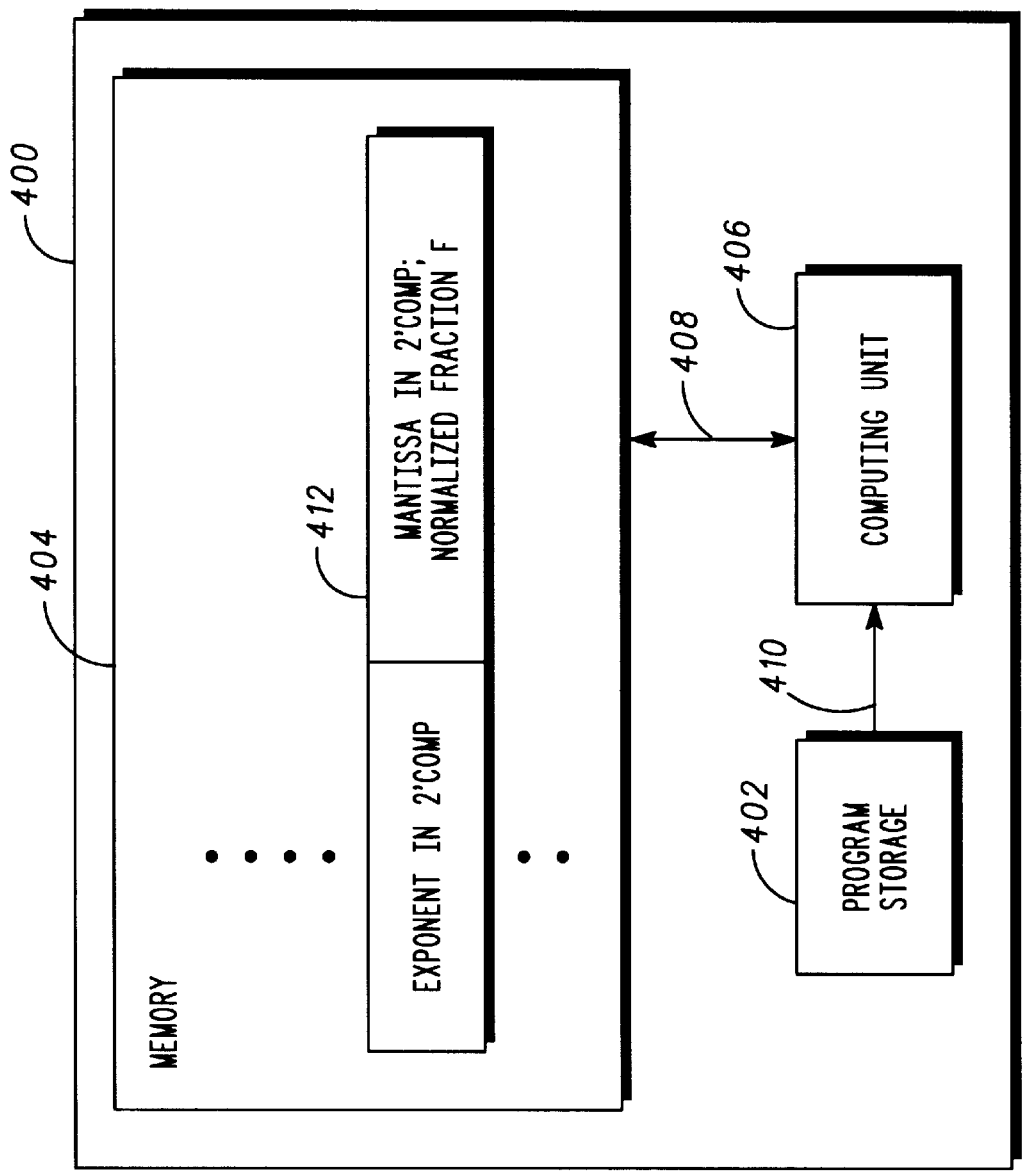
FIG. 4 shows a micro processor system which incorporates the principles of the invention.

With reference to FIG. 4 it is explained in greater detail with respect to a preferred embodiment how the invention can be used for computing purposes. FIG. 4 shows an electronic system 400 which can be any electronic device requiring some kind of computing and/or digital signal processing. Typical examples are telecommunication devices such as cellular phones.

The electronic system 400 has a program storage 402 and memory 404. Computing unit 406 is coupled via a bi-directional bus 408 to the memory 404. A program stored in the program storage 402 can be loaded into the computing unit 406 via line 410.

The memory 404 contains a number of data words which are represented in a format according to the invention. One of the data words is shown by way of example as data word 412. When the computing unit 406 has to carry out some kind of a digital signal processing calculation it loads the corresponding computer program from the program storage 402. In order to carry out the digital signal processing program data words have to be fetched via the bi-directional bus 408 from the memory 404. The data required for carrying out the computer program is in the unique format according to the invention.

This allows to take advantage of the improved adding of numbers which are represented in a format according to the invention in the computing unit 406—for example if the computing unit is a micro processor the micro processor can comprise one or more adders of the type shown in FIG. 3 to more economically carry out large numbers of summations.

Figure 5:
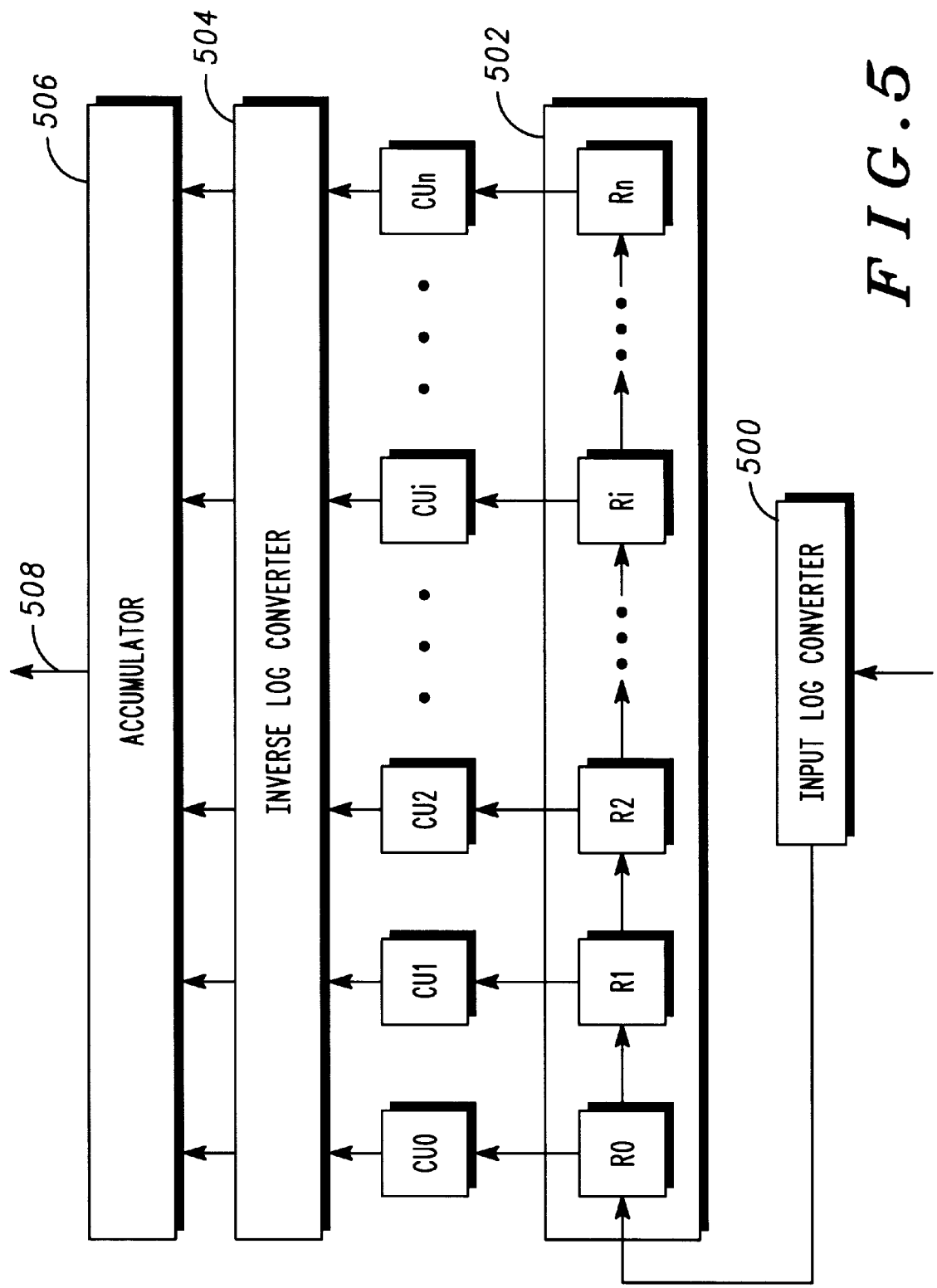
FIG. 5 shows an embodiment of a computer system which uses the principles of the invention.

FIG. 5 shows a block diagram of a computer system in which the unique representation of a number according to the invention is particularly beneficial. The input block converter 500 receives input data words to be inputted into the computer system. An input data word is logarithmized by the input log converter 500 and inputted into the first register R0 of data pipeline 502.

The data pipeline 502 consists of a number of registers R0 to Rn which are coupled together to form a shift register chain. Each of the registers Ri is coupled to its corresponding computing unit CUi. Each of the computing units CU0–CUn can access its corresponding register $R_i$ to access a data word which is stored in the corresponding register.

Each of the computing units CU0–CUn has an output which is coupled to reverse log converter 504. The inverse log converter 504 performs an inverse logarithm operation on the output of the computing unit CUi to transform the result of the computation back into the normal domain. The results which are obtained by inverting the outputs of the computing units CUi are transferred to an accumulator 506 which adds all the results so that final output results at the output 508 of the accumulator 506.

In operation a sequence of data input words are received by the input block converter 500 and a resulting sequence of input data which are in the log domain is shifted into the data pipeline 502. Each computing unit CUi accesses its corresponding register Ri to obtain the corresponding data input value. A computation is performed in the computation unit CUi and the result is outputted to the inverse log converter 504 to transform the result of the computation back from the log domain into the normal domain.

All the results of the computing units are accumulated in the accumulator 506 after the inverse log operation which is performed by inverse log converter 504. The computation which is carried out in the computation units CUi can be of a finite impulse response filter or infinite impulse response filter type. In this case each of the computing units CUi has one coefficient of such a filter operation stored in an internal register which is not shown in the drawing for simplicity. To perform such a filter operation in each computing unit the corresponding coefficient has to be multiplied with the input data word stored in the corresponding register. Since this multiplication is carried out in the log domain the multiplication becomes a summation. In the latter case in fact the computing units CUi are adders which can be implemented by means of an adder of the type as shown in FIG. 3 provided that both the input data words in the log domain which are stored in the registers Ri as well as the coefficients of the filter operations which are stored in the computing units are represented in a format according to the principles of the invention.

Since in an architecture of the type shown in FIG. 5 a large number of computing units exists the use of an adder of the type as shown in FIG. 3 has a very substantial positive effect.

The same applies analogously to the implementation of the accumulator 506 which can also be realized by adders of the type shown in FIG. 3 again provided that the output of the inverse log converter 504 is represented in a format in accordance with the principles of the invention.

We claim:

1. A method for electronically representing a number V in a binary data word, the data word having a set of exponent bits E and having a set of mantissa bits M, the method comprising the steps of representing the exponent bits E in 2' complement form and representing the mantissa bits M in 2' complement form whereby in case that the number V is positive, a fraction F of the mantissa bits M of the number V is normalized to a 01.F form and the exponent bits E are adapted by shifting the number V a number of times and adding the number shifts to the exponent bits E of the number V; and in case that the number V is negative, the fraction F of the mantissa bits M is normalized to a 10.F form and the exponent bits E are adapted by converting the number V into a 2'complement form, shifting the number V a number of times, and adding the number of shifts to the exponent bits E of the number V; and dropping the leading mantissa bit to form a binary word including the resulting exponent bits E and mantissa bits.

2. The method according to claim 1, whereby one of the mantissa bits M is a sign bit and the remaining sub-set of bits is the fraction F so that the number V equals:

in case that the sign bit indicates that the number V is positive;

$$V = +1.F \cdot 2^E$$

in case that the sign bit indicates that the number V is negative;

$$V = -2^E \cdot (4 - 2.F).$$

3. The method according to claim 1 whereby a predefined value of the exponent bits indicates that the number V equals zero.

4. The method according to claim 3, wherein the predefined value of the exponents bits is a leading 1 with a sequence of zeros.

5. A method for adding a number A and a number B, the number A being represented by exponent bits E(A) and mantissa bits M(A) and the number B being represented by exponent bits E(B) and mantissa bits M(B) according to the steps of:

representing the exponent bits E(A) and E(B) in 2' complement form and representing the mantissa bits M(A) and M(B) in 2' complement form whereby in case that the number A or B is positive, a fraction F of the respective mantissa bits M(A) or M(B) is normalized to a 01.F form and the exponent bits E(A) or E(B) are adapted by shifting the respective number A or B a number of times and adding the, number of shifts to the exponent bits E(A) or E(B), respectively; and in case that the number A or B is negative, the fraction F of the mantissa bits M(A) or M(B) is normalized to a 10.F form and the exponent bits E(A) or E(B) are adapted by converting the respective number A or b into a 2' complement form, shifting the receptive number A or B a number of times, and adding the number of shifts to the exponent bits E(A) or E(B) respectively; and dropping the leading mantissa bit to form a binary word including the resulting exponent bits E and mantissa bits the method comprising the steps of:

a) determining which one of the exponents as represented by the exponent bits E(A) and E(B), respectively, is bigger;

b) defining the exponent bits E(R) of an result to be equal to the exponent bits representing the bigger exponent;

c) calculating the absolute difference D of the exponents as represented by the exponent bits E(A) and E(B), respectively;

d) shifting the mantissa bits of one of the numbers A and B having the smaller exponent as determined in step a) for a number of D shifts to the right;

e) adding the mantissa bits of one of the numbers A and B having the bigger exponent and the mantissa bits as shifted in step d);

f) in case an overflow occurs in step e): Adding 1 to the exponent bits E(R) of the result and shifting the resulting sum of step e) to the right; and g) in case no overflow occurs in step e): Detecting a length L of a sequence of leading 1 or leading 0 in the resulting sum of step e); in case the sequence consists only of zeros: defining the exponent bits E(R) of the result to have a predetermined value; and otherwise shifting the resulting sum of step e) for a number of L−1 positions to the left and subtracting L−1 from the exponent bits E(R) of the result.

6. An adder for adding two numbers A and B, the number A having an exponent E(A) and a mantissa M(A) and the number B having an exponent E(B) and a mantissa M(B), the adder comprising a) a subtractor for obtaining the absolute value of the difference between the exponents E(A) and E(B), the subtractor having a first control output and a second control output, said first control output indicating which one of the exponents E(A) and E(B) is bigger and said second control output indicating the absolute value of the difference between the exponent E(A) and E(B);

b) a swap circuit for selectively swapping the mantissas M(A) and M(B), the swap circuit having a first control input and a first and a second data output, the first control input being coupled to the first control output;

c) a barrel shifter having a second control input and a first data input, the second control input being coupled to the second control output and the first data input being coupled to the first data output of the swap circuit;

d) an adder block having a second data input and a third data input, the second data input being coupled to the barrel shifter and the third data input being coupled to the second data output of the swap circuit, the adder having a third data output for outputting a result;

e) a leading msb detector coupled to the third data output of the adder block to detect a sequence of leading 0 or 1 bits, the sequence having a length L; and f) a barrel shifter coupled to the third data output of the adder block and to the leading msb detector to shift the result for a number of L−1 shifts to the left in order to normalize the result.

7. The adder according to claim 6 further comprising a multiplexor for multiplexing the exponents E(A) and E(B), the multiplexor being controlled to select the bigger one of the exponents E(A) and E(B);

a subtractor/adder by 1 block coupled to an output of the multiplexor, the subtractor/adder by 1 block being coupled to the leading msb detector to receive the length L of the sequence, the subtractor/adder by 1 block being adapted to subtract L−1 from the bigger one of the exponents E(A) and E(B) and the subtractor/adder by 1 block being adapted to add 1 to the bigger one of the exponents E(A) and E1(B) in case an overflow occurs in the adder block.

8. The adder according to claim 7 the multiplexor comprising a zero code detector to detect if one of the exponents E(A) and/or E(B) has a predefined value which indicates that the corresponding number A and/or B is equal to zero.

9. A computer-readable medium being encoded with a computer program for digital signal processing of a number V, said computer program being adapted to be carried out by a microprocessor whereby the number V is electronically represented in a binary data word, the data word having a set of exponent bits E and having a set of mantissa bits M, the exponent bits E being represented in 2' complement form and the mantissa bits M being represented in 2' complement form whereby in case that the number V is positive, a fraction F of the mantissa bits M of the number V is normalized to 01.F form and the exponent bits E are adapted by shifting the number V a number of time, and adding the number shifts to the exponent bits E of the number V; and in case that the number V is negative, the fraction F of the mantissa bits M is normalized to a 10.F form and the exponent bits E are adapted by converting the number V into a 2' complement form, shifting the number V a number of times, and adding the number of shifts to the exponent bits E of the number V; and dropping the leading mantissa bit to form a binary word including the resulting exponent bits E and mantissa bits.

10. A computer system comprising:

an input log converter;

a data pipeline;

a number of computing units; and an inverse log converter;

wherein the input log converter is adapted to convert input data words into a log domain and to shift log converted input data words into the data pipeline;

wherein the data pipeline is coupled to the computing units, so that when a data word is shifted through the data pipelines consecutive computing units receive the data word as an input;

wherein each computing unit has an output coupled to the inverse log converter to perform a conversion back from the log domain to obtain a result; and wherein an input data word V is electronically represented in the log domain in a binary data word, the data word having a set of exponent bits E and having a set of mantissa bits M, the exponent bits E being represented in 2' complement form and the mantissa bits M being represented in 2' complement form whereby in case that the number V is positive, a fraction F of the mantissa bits M Of the number V is normalized to 01.F form and the exponent bits E are adapted by shifting the number V a number of times and adding the number shifts to the exponent bits E of the number V; and in case that the number V is negative, the fraction F of the mantissa bits M is normalized to a 10.F form and the exponent bits E are adapted by converting the number V into a 2' complement form, shifting the number V a number of times, and adding the number of shifts to the exponent bits E of the number V; and dropping the leading mantissa bit to form a binary word including the resulting exponent bits E and mantissa bits.

11. A computer system comprising an input log converter;

a data pipeline;

a number of computing units, each computing unit having an adder for adding a first number M(A) and a second number M(B), the first and second numbers being normalized to have either a leading 01 or a leading 10 in a binary representation, wherein the adder circuit comprises a) an adder block for adding the first number M(A) and the second number M(B) to obtain a result;

b) a leading msb detector coupled to an output of the adder block to detect a sequence of leading 0 or 1 bits in the result, the sequence having a length L; and c) a barrel shifter to shift the result for a number of L−1 shifts to the left in order to normalize the result; and an inverse log converter;

wherein the input log converter is adapted to convert input data words into a log domain and to shift log converted input data words into the data pipeline;

wherein the data pipeline is coupled to the computing units, so that when a data word is shifted through the data pipelines consecutive computing units receive the data word as an input;

wherein each computing unit has an output coupled to the inverse log converter to perform a conversion back from the log domain to obtain a result.

* * * * *

UNITED STATES PATENT AND TRADEMARK OFFICE
CERTIFICATE OF CORRECTION

PATENT NO. : 5,923,575
DATED : Jul. 13, 1999
INVENTOR(S) : Efrat et al.

It is certified that error appears in the above-identified patent and that said Letters Patent is hereby corrected as shown below:

Column 12, line 9 reads "number A or b"; should read --number A or B--

Column 13, line 22 reads "E1(B)"; should read --E(B)--

Column 13, line 38 after "normalized to"; should read --normalized to a--

Column 13, line 40 reads "time" should read --times--

Column 14, line 15 reads "M Of"; should read --M of--

Column 14, line 15 after "normalized to"; should read --normalized to a--

Signed and Sealed this

Twenty-ninth Day of February, 2000

Attest:

Q. TODD DICKINSON

Attesting Officer

Commissioner of Patents and Trademarks